United States Patent [19]

Blount

[11] 4,252,934
[45] Feb. 24, 1981

[54] PROCESS FOR THE PRODUCTION OF POLY(ALDEHYDE AMINOSILICON ACID) RESINOUS PRODUCTS

[76] Inventor: David H. Blount, 5450 Lea St., San Diego, Calif. 92105

[21] Appl. No.: 130,576

[22] Filed: Mar. 14, 1980

Related U.S. Application Data

[63] Continuation-in-part of Ser. No. 908,106, May 22, 1978, Pat. No. 4,198,491, which is a continuation-in-part of Ser. No. 845,464, Oct. 25, 1977, Pat. No. 4,120,937.

[51] Int. Cl.$^3$ .............................. C08G 2/00; C08J 9/14

[52] U.S. Cl. .................................. 528/38; 260/37 N; 260/37 SB; 521/154; 528/10; 528/125; 528/230; 528/270

[58] Field of Search ................. 528/10, 125, 230, 270, 528/382; 260/37 N, 37 SB

[56] References Cited

U.S. PATENT DOCUMENTS 4,185,147  1/1980  Blount .................................. 521/107

*Primary Examiner*—Morton Foelak

[57] ABSTRACT

Poly(aldehyde aminosilicon acid) resinous products are produced by reacting an aminosilicon acid compound with an aldehyde compound.

10 Claims, No Drawings

PROCESS FOR THE PRODUCTION OF POLY(ALDEHYDE AMINOSILICON ACID) RESINOUS PRODUCTS

CROSS-REFERENCE TO RELATED APPLICATIONS

This Application is a continuation-in-part of my copending U.S. patent application Ser. No. 908,106, filed May 22, 1978, now U.S. Pat. No. 4,198,491 which is a continuation-in-part of my copending U.S. patent application, Ser. No. 845,464, filed Oct. 25, 1977, now U.S. Pat. No. 4,120,937.

BACKGROUND OF THE INVENTION

This invention relates to a process for the production of novel poly(aldehyde aminosilicon acid) resinous products and foams by reacting a mixture of halosilicon acids with organic amino compounds to produce aminosilicon acid compound which is then reacted with an aldehyde compound.

Halosilicon acids are produced by reacting a silicon halide with a hydrated silica compound as illustrated in U.S. Pat. No. 4,120,937. U.S. patent application Ser. No. 845,464, filed Oct. 25, 1977, now U.S. Patent No. 4,120,937 is incorporated in this application.

The poly(aldehyde aminosilicon acid) resinous products produced by the process of this invention may be utilized as molding powders, as films, as sheets, as protective coating on wood or metals, as caulking compound, as an adhesive, in the production of polyurethane silicate resins and foams, in the production of epoxy silicate resins, etc. The molding powder may be molded into useful objects such as knobs, handles, gears, art objects, toys, etc., by using heat and pressure to force the melted polyamide silicate resinous product into a mold.

A dry, fine granular hydrated silica or hydrated silica containing Si-H groups such as silicoformic acid and polysilicoformic acid may be used in the production of halosilicon acids. The hydrated silica may be produced by any of the methods known in the arts.

Any suitable silicon halide may be used in the production of the halosilicon acids. The silicon halide preferably should contain at least 2 halogen radical but preferably 3 or 4 halogen radicals. Exemplificative silicon halides include but are not limited to, the following compounds; silicon tetrachloride, silicon tetrabromide, silicon tetrafloride, silicon tetraiodide, methyltrichlorosilane, dimethyldichlorosilane, diethyldichlorosilane, di-n-butyl-dichlorosilane, diphenyldichlorosilane, phenyltrichlorosilane, ethyl phenyldichlorosilane, methyl ethyldichlorosilane, methylpropyldichlorosilane, etc.

Silicon tetrachloride is the preferred silicon halide. The silicon tetrachloride may be utilized with any of the silicon halides or mixtures thereof. It is preferable to utilize the diorganic-dihalosilanes with silicon tetrachloride in the production of halosilicon acids.

For the purpose of this invention the products produced by the chemical reaction of hydrated silica with a silicon halide will be called a mixture of halosilicon acids.

The halosilicon acids are produced by reacting 0.5 to 2 mols of a hydrated silica with 1 mol of a silicon halide. The mols of the halosilicon acid are calculated on the mols of the silicon halide used to produce the mixture of the halosilicon acids.

Poly(aldehyde aminosilicon acid) resinous products are produced by reacting the following components:
(a) 1 to 2 parts by weight of an aminosilicon acid
(b) 1 to 5 parts by weight of an aldehyde

Component (a)

Any suitable aminosilicon acid compound may be used in this invention. The production of aminosilicon acids are illustrated in U.S. patent application Ser. No. 845,464, filed Oct. 25, 1977, now U.S. Pat. No. 4,120,937. The aminosilicon acid compound is produced by mixing 1 to 2 parts by weight of an amino compound with about 1 part by weight of a mixture of halosilicon acids which contain at least 2 halogen radicals per molecule then heating the mixture to a temperature to just above the melting point of the amino compound or to just below the boiling or decomposition temperature of the reactants, usually a temperature between 50° C. to 100° C. is satisfactory, while agitating for 30 to 60 minutes thereby producing an aminosilicon acid compound.

Any suitable amino compound may be used in the production of aminosilicon acid compounds. Suitable amino compounds include but not limited to urea, thiourea, dicyandiamine, aniline, polyamines, guanidine, alkyl-substituted ureas, melamine and mixtures thereof. Urea is the preferred amino compound.

Component (b)

Any suitable aldehyde may be used in this invention. Suitable aldehydes include but are not limited to formaldehyde, aqueous solutions of formaldehyde, acetoaldehyde, furfural, crotonaldehyde, acrolein, acrylic aldehyde, butylaldehyde, chloral, paraformaldehyde, benzylaldehyde and mixtures thereof.

Condensation products of aldehyde such as hexamethylene tetraamine may also be used in this invention alone or with other aldehydes.

Formaldehyde is the preferred aldehyde compound.

The chemical reaction between an aminosilicon acid and an aldehyde may be catalized by either an alkali or acid catalyst.

Suitable alkali catalyst include alkali metal hydroxide such as sodium hydroxide and potassium hydroxide, alkali metal carbonate, such as sodium carbonate and potassium carbonate, alkaline earth metal hydroxide such as calcium hydroxide, ammonium hydroxide, quatarnary ammonium hydroxide, sodium silicate, potassium silicate and mixtures thereof.

Suitable acidic catalyst include mineral acids such as sulfuric acid, hydrochloric acid and phosphoric acid, organic acids such as formic acid, acetic acid, oxalic acid, tartaric acid, aromatic sulfonic acids, hydrogen containing acid salts such as sodium hydrogen sulfate, potassium hydrogen sulfate and sodium dihydrogen phosphate, and mixtures thereof.

Suitable phenol compounds may be reacted with the aminosilicon acid compound and aldehyde compound to produce poly(aldehyde phenol aminosilicon acid) resinous product or foam. The phenol compound is added in the amount of 0.5 to 2 parts by weight of a phenol compound to 1 to 2 parts by weight of the aminosilicon acid compound.

Suitable phenol compounds include but not limited to phenol, p-cresol, o-cresol, m-cresol, cresylic acid, xylenols, resorcinol, cashew-nut shell liquid, anacordol, p-tert-butyl phenol, cardol, Bisphenol A, creosote oil, 2,6-dimethylphenol, chlorophenol, nitrophenol, hydroquinone, pyrogallol, naphthol, phenolic acid extracted from bark (U.S. Pat. No. 3,371,054) and mixtures thereof. Phenol is the preferred phenol compound.

The primary object of the present invention is to produce novel poly(aldehyde aminosilicon acid) resinous products and foams. Another object is to produce poly(aldehyde aminosilicon acid) resinous products that can be melted then poured or forced under pressure into molds of useful objects. A further object is to produce poly(aldehyde aminosilicon acid) resinous products that may be further reacted with polyisocyanates to produce useful resins and foams. A still further object is to produce poly(aldehyde aminosilicon acid) resinous products that may be utilized as adhesives as protective coating for wood and metals and foams used as a thermal and sound insulator. Another object is to produce novel poly(aldehyde-phenol-amino-silicon acid) resinous products which may be used as molding powder, adhesive, protective coating for wood and metal.

DETAILED DESCRIPTION OF THE INVENTION

The preferred process to produce poly(aldehyde aminosilicon acid) resinous products is to mix 1 to 2 parts by weight of an aminosilicon acid compound with 1 to 5 parts by weight of an aldehyde compound then heat the mixture to a temperature between ambient temperature and the boiling temperature of the reactants while agitating at ambient pressure for 30 to 60 minutes thereby producing a poly(aldehyde aminosilicon acid) resinous product.

In an alternate process an acid catalyst is added to the mixture of aminosilicon acid and aldehyde until the pH is 4 to 6, as tested in an aqueous solution, then the mixture is heated to a temperature between ambient temperature and the boiling temperature of the reactants while agitated for 30 to 60 minutes or until the reaction is complete. An alkali catalyst may be used in the curing process when the resinous product is molded into useful objects.

In an alternate process an alkali catalyst is added to the mixture of aminosilicon acid compound and aldehyde until the pH is 8 to 12, as tested in an aqueous solution, then the mixture is heated to a temperature between ambient temperature and the boiling temperature of the reactants while agitating for 30 to 60 minutes or until the reaction is completed. An acid catalyst may be used in the curing process when the poly(aldehyde aminosilicon acid) resinous product is molded into useful objects or foamed.

The chemical reactions of this invention may take place in any suitable physical condition. Ambient pressure is usually satisfactory but in certain conditions an elevated or below ambient pressure may be useful. Reduced pressure may be used to aid in removing the water and solvents when used such glycerol with phenol compound. While many of the reactions will take place acceptably at ambient temperature, better results may be obtained at somewhat elevated temperatures.

A poly(aldehyde aminosilicon acid) foam may be produced by mixing 1 to 2 parts by weight of a urea-silicon acid compound, 1 to 5 parts by weight of an aqueous solution of formaldehyde consisting of 1 to 5 mols of the aldehyde per mol of the amino compound used to produce the urea-silicon compound, up to 50% by weight, percentage based on the weight of the reactants aminosilicon acid and aldehyde, of an inert liquid blowing agent composed of an inert liquid, boiling at temperatures from −25° C. to +80° C. and an acid catalyst in an aqueous solution in an amount that will produce a pH of 4 to 6. The mixture expands 3 to 12 times its original volume to produce a tough rigid poly(aldehyde aminosilicon acid) foam. Other aldehydes were used instead of formaldehyde such as paraformaldehyde and furfural. Other aminosilicon acids compounds may be used with the urea-silicon acid compounds. The aminosilicon compounds may also be used with urea to produce the poly(aldehyde aminosilicon acid) foams. Also 0.5 to 2 parts by weight of a phenol compound may be added with the urea-silicon acid compound to produce a poly(aldehyde phenol aminosilicon acid) foam.

A poly(aldehyde phenol aminosilicon acid) resinous product may be produced by mixing 1 to 2 parts by weight of an aminosilicon acid compound, 1 to 5 parts by weight of an aldehyde, and 0.5 to 2 parts by weight of a phenol compound then heating the mixture between ambient temperature and the boiling temperature of the reactants while agitating for 30 to 60 minutes thereby producing a poly(aldehyde phenol aminosilicon acid) resinous product.

The poly(aldehyde aminosilicon acid) resinous products and the poly(aldehyde phenol aminosilicon acid) resinous products may be used as molding powder; the molding powder is heated to softening or melting temperature then molded by pressure into useful products such as tool handles, knobs, trays, door handles, sheets, panels, art objects, etc. The resinous products are soluble in organic solvents and may be used on wood and metal as a coating agent. The resinous products will react with polyisocyanates and epoxide compounds to produce useful foams, adhesives, coating agents, impregnants, laminates and molding powders.

The poly(aldehyde aminosilicon acid) and poly(aldehyde phenol aminosilicon acid) react chemically with suitable polyisocyanates and/or polyisothiocyanates to produce resinous products and foams.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

where R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

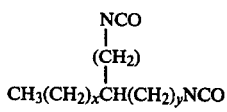

where x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenylpolymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkylsubstituted on the nucleus, with aldehydes or ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4-; and methylene-bis-(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane-prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhyrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bisglycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol, cyclohexanedimethanol-(1,4-bishydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as $\tau$-caprolactone, or hydroxycarboxylic acid such as $\omega$-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide propylene oxide, butylene oxide, tetrahydrofurane oxide, styrene oxide or epichlorohydrin, each with itself, e.g., in the presence of $BF_3$, or by addition of these epoxides, optionally as mixtures of successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitriles in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers of polythioether ester amines, depending on the cocomponent.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Organic hydroxyl silicate compounds as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing, polyurethane silicon acid resinous or foamed products. The following are examples of polyisocyanate curing agents and activators:

1. Water
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Me_2OSiO_2$ (ME=metal) is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 20% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methyl-morpholine; N-ethylmorpholine; N,N,N',N'-tetramethylenediamine; 1,4-diazobicyclo-(2,2,2)-octane; N-methyl-N'-dimethylaminoethyl piperazine; N,N-dimethylbenzylamine; bis(N,N-diethylaminoethyl)-adipate; N-N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopropanolamine; N,N-dimethylethanolamine; N-methyl-diethanolamine; N-ethyl-diethanolamine; and their reactive products with alkylene oxides, e.g., propylene oxide and/or ethylene oxide and mixtures thereof.
   (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds as described, e.g., in British Pat., No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action, are described in Kunststoff-Handbuch, Volume VII, published by Vieweg and Hochtlen, Carl-Hanser-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat., No. 3,629,308. These additives are preferably used in quantities of 0% to 20%, but preferably 0.01% to 20% by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich 1966, e.g., on pages 103 to 113. The halogenated paraffins and inorganic salts of phosphoric acid are the preferred fire-retarding agents.

The preferred curing agent is an aqueous solution of silicates, sodium silicate and/or potassium silicate in water which are normally known as water glass. Aqueous solutions of silicates may be prepared in the form of 25% to 54% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)phosphate; polyoxypropylene-chloromethylphosphonate; cresyldiphenylphosphate; tricresylphosphate; tris-(beta-chloroethyl)phosphate; tris-(2,3-dichloropropyl)-phosphate; triphenylphosphate; ammonium phosphate; perchloroinated diphenyl phosphate; perchlorinated terephenyl phosphate; hexabromocyclodecane; tribromophenol; dibromopropyldiene, hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing compounds are, however, preferred in the polyurethane silicon acid products.

The ratios of the essential reactants and optional reactants which lead to the polyurethane silicate resinous or foamed product of this invention may vary, broadly speaking, with ranges as follows:

(a) 1 to 95 parts by weight of poly(aldehyde aminosilicon acid) resinous product;

(b) 50 parts by weight of polyisocyanate, polyisothiocyanate or isocyanate-terminated polyurethane prepolymer;

(c) up to 20% by weight of a foam stabilizer;

(d) up to 50% by weight of a chemically inert blowing agent, boiling within the range of from −25° C. to 80° C.;

(e) up to 10% by weight of an activator;

(f) up to 200 parts by weight of a water-binding agent.

(g) 1 to 95 parts by weight of a polyol.

Percentages are based on the weight of the poly(aldehyde aminosilicon acid) resinous product, polyol, and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, it is preferred that the isocyanate-terminated polyurethane prepolymer be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3–100 milliequivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0–200% by weight, based on the weight of Components a, b and c. When a water-binding agent is added and when the curing agent is an aqueous alkali metal silicate solution, a halogen or phosphorus-containing compound or mixture thereof may be added in the amount of 1% to 30% by weight, based on the weight of the reactants, Components a, b and c.

Suitable hydraulic cements are, in particular, Portland cement, quick-setting cement, blast-furnace Portland cement, mild-burnt cement, sulphate-resident cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference.

Organic blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with Components a, b or c or be reacted with the polyisocyanate to produce a polyurethane silicon acid prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used is the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane silicon acid plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then once foaming has started, the heat evolved by the reaction between components continues the foaming until the reaction is complete. A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reacting, the poly(aldehyde aminosilicon acid) resinous product, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire-resistance. The amount of water-binding component used varies greatly, depending on the type of product desired, from 1% to 200% by weight, based on Components a, b and c polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibres, carbon fibers, graphite, carbon black, Al, Fe, Cri and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles filled or unfilled, foamed or unfoamed, stretched or unstretched organic polymers, may be added to the mixture of the Components a, b and c in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked-up in a kneader.

In many cases, the polyurethane silicon acid resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

When the poly(aldehyde aminosilicon acid) resinous product and polyisocyanate are combined with expanded clay and an alkali metal silicate solution, a very good concrete is obtained which can, for example, be used as panels in the construction field. In this case, the foam material (expanded clay) plays the part of the binding material.

DESCRIPTION OF PREFERRED EMBODIMENTS

The following example which describe certain preferred embodiments of the processes may, of course, be varied as described above with similar results. Parts and percentages are by weight unless otherwise indicated.

EXAMPLE 1

About 2 parts by weight of a dry, fine granular hydrated silica and 3 parts by weight of silicon tetrachloride are mixed at ambient pressure and temperature than agitated. Hydrogen chloride is given off the mixture. The reaction is complete in 6 to 12 hours, thereby producing a white, fine, granular mixture of halosilicon acids.

About 1 to 2 parts by weight of urea are mixed with the halosilicon acids then heated to just above the melting point of urea while agitating at ambient pressure for 30 to 60 minutes thereby producing aminosilicon acid compounds.

The aminosilicon acid compounds are then mixed with an aqueous solution containing 37% formaldehyde in the ratio of 1 mol of the amino compound to 1 to 5 mols of the formaldehyde then heating to 70° C. to 100° C. while agitating at ambient pressure for 30 to 60 minutes, thereby producing poly(aldehyde aminosilicon acid) resinous product.

Other amino compounds may be used in place of urea such as thiourea, dicyandiamine, melamine, aniline, quanidine, alkyl-substituted ureas, polyamines and mixtures thereof.

Other aldehydes may be used in place of formaldehyde such as acetoaldehyde, furfural, acrylic aldehyde, butylaldehyde, chloral, paraformaldehyde and mixtures thereof.

EXAMPLE 2

About 2 parts by weight of a dry, fine, granular hydrated silica are slowly added to 4 parts by weight of silicon tetrachloride while agitating for 1 to 4 hours, thereby producing a fine, white, granular mixture of halosilicon acids. Hydrogen chloride is given off the mixture.

About 5 parts by weight of dicyandiamine are mixed with the mixture of halosilicon acid then heating to just above the melting point of dicyandiamine while agitating at ambient pressure for 30 to 60 minutes thereby producing an aminosilicon acid compound.

The aminosilicon compound is then mixed with about 5 parts by weight of furfural, the mixture has a pH of about 5 in an aqueous solution, and the reaction is complete in a few minutes thereby producing a poly(aldehyde aminosilicon acid) resinous product.

EXAMPLE 3

About 2 parts by weight of a dry, fine, granular silicoformic acid, 2 parts by weight of silicon tetrachloride and 1 part by weight of methyltrichlorosilane are mixed. Hydrochloric acid is given off from the mixture. The mixture is agitated at a temperature just below the boiling point of silicon tetrachloride for 1 to 4 hours, and the chemical reaction is complete in 6 to 12 hours thereby producing a fine, white, granular mixture of halosilicon acids.

About 3 parts by weight of thiourea and 3 parts by weight of acetoaldehyde are mixed with the halosilicon acids then heating the mixture at a temperature just below the boiling temperature of the reactants while agitating for 30 to 60 minutes thereby producing a poly(aldehyde aminosilicon acid) resinous product.

EXAMPLE 4

About 3 parts by weight of silicon tetrachloride are slowly added while agitating to 2 parts by weight of fine granular hydrated silica at ambient temperature and pressure; the reaction is complete in 6 to 12 hours thereby producing a white colored, fine, granular mixture of halosilicon acids.

About 4 parts by weight of the above halosilicon acids are mixed with 2 parts by weight of urea and 2 parts by weight of melamine then heated to just above the melting point of urea while agitating for 30 to 60 minutes thereby producing an aminosilicon acid compound.

About equal parts by weight of this aminosilicon acid compound and a 37% aqueous solution of formaldehyde and sufficient sodium carbonate to produce of pH of about 8 are mixed then heated to just below the boiling temperature of the reactants while agitating for 30 to 60 minutes thereby producing a poly(aldehyde aminosilicon acid) resinous product. The product may be produced in the form of a thick liquid or a solid. The resinous product may be cured by the addition of an acid catalyst and heat.

EXAMPLE 5

About 3 parts by weight of the urea-silicon acid compound produced in Example 1, 3 mols of formaldehyde in an aqueous solution per mol of amino compound with a pH of about 4 produced by addition of hydrochloric acid and 1 part by weight of a blowing agent, methylene chloride are rapidly mixed. The mixture expands to 3 to 10 times its original volume and solidifies thereby producing a poly(aldehyde aminosilicon acid) foam.

EXAMPLE 6

About 3 parts by weight of the aminosilicon acid compound as produced in Example 1, 1 part by weight of dicyandiamine, 4 mols of formaldehyde per mol of amino compound in an aqueous solution with a pH of about 5 produced by the addition of sulfuric acid and 1 part by weight a blowing agent trichlorotrifluoroethane are rapidly mixed. The mixture expands to 3 to 10 times its original volume and solidifies thereby producing a rigid poly(aldehyde aminosilicon acid) foam.

EXAMPLE 7

About 4 parts by weight of the aminosilicon acid as produced in Example 1, 0.5 parts by weight of cresylic acid, 3 parts by weight of a 37% aqueous formaldehyde solution which has a pH of about 5 produced by the addition of acetic and 0.5 parts by weight of a blowing agent, methylene chloride, are rapidly mixed. The mixture expands 3 to 12 times its original volume thereby producing a poly(aldehyde phenol aminosilicon acid) foam.

The foam is rigid and very tough. It may be used for thermal and sound insulation, for packaging and molded into useful objects such as art object, building components, etc.

EXAMPLE 8

About 4 parts by weight of the aminosilicon acid as produced in Example 2, 1 part by weight of phenol and 3 parts by weight of a 37% aqueous formaldehyde solution are mixed then heated to just below the boiling temperature (70° to 100° C.) of the reactants while agitating at ambient pressure for 30 to 60 minutes thereby producing a poly(aldehyde phenol aminosilicon acid) resinous product.

Other phenol compounds may be used in place of phenol such as cresols, xylenols, creosote, resorcinol, Bisphenol A and mixtures thereof.

The resinous product may be molded into useful products by the use of heat, pressure and an alkali or acid catalyst.

EXAMPLE 9

About 2 parts by weight of the mixture of halosilicon acids as produced in Example 1 and 2 parts by weight of diethylenetriamine are mixed then heated to just below the boiling point of diethylenetriamine while agitating at ambient pressure for 30 to 60 minutes thereby producing an aminosilicon acid compound; then about 2 mols of formaldehyde per mol of diethylenetriamine in an aqueous solution are mixed with the aminosilicon acid compound then heated to just below the boiling temperature of the reactants while agitating at ambient pressure for 30 to 60 minutes thereby producing a poly(aldehyde aminosilicon acid) resinous product.

Other polyamine compounds may be used in place of diethylenetriamine such as aliphatic, cycloaliphatic, aromatic or heterocyclic polyamines and mixtures thereof.

EXAMPLE 10

About 20 parts by weight of the poly(aldehyde aminosilicon acid) resinous product as produced in Example 1 and 10 parts by weight of "Crude MDI" are thoroughly mixed and in a few minutes the mixture solidifies into a hard tough polyurethane silicon acid product.

Other polyisocyanates may be used in place of "Crude MDI" such as aliphatic, cycloaliphatic, araliphatic, aromatic and heterocyclic polyisocyanates.

EXAMPLE 11

About 20 parts by weight of the thick liquid poly(aldehyde aminosilicon acid) resinous product as produced in Example 4 and 10 parts by weight of "TDI" produced by Olin chemical are thoroughly mixed then 0.3 part by weight of triethylamine is added and thoroughly mixed then in a few seconds the mixture expands 8 to 12 times its original volume to produce a tough rigid polyurethane silicon acid foam.

EXAMPLE 12

About 20 parts by weight of the poly(aldehyde aminosilicon acid) resinous product as produced in Example 4, 20 parts by weight of "POLY G 30-56" produced by Olin Chemical, 30 parts by weight of sodium metasilicate pentahydrate granules, 1 part by weight of sodium docytl sulfosuccinate and 5 parts by weight of "CURITHANE 51" produced by Upjohn are mixed then heated to about 50° C. while agitating then the mixture is thoroughly mixed with 50 parts by weight of "PAPI 27" produced by Upjohn and 10 parts by weight of trichlorotrifluoroethane. The mixture rapidly expands to produce a tough semi-rigid polyurethane silicon acid foam with a density of about 2 pounds per cubic foot.

EXAMPLE 13

About 20 parts by weight of the poly(aldehyde phenol aminosilicon acid) resinous product as produced in Example 8, 10 parts by weight of "POLY G 71-530", 30 parts by weight of MDI, 30 parts by weight of Portland cement and 30 parts by weight of plaster's sand are mixed thoroughly and poured in a mold of concrete block. The mixture expands about 8 to 10 times its original volume and solidifies within 4 to 5 minutes thereby producing a tough rigid polyurethane silicon acid foamed building block. The block is wet with water for about 2 minutes to cure the unreacted cement thereby producing a polyurethane silicon acid concrete foamed block. A 2"×6"×16" block weighs about 2 pounds and has excellent insulation and flame resistant properties.

Other water binding agents may be used in place of Portland cement such as other hydraulic cements, synthetic anhydride, gypsum and burnt lime.

EXAMPLE 14

About 20 parts by weight of the poly(aldehyde aminosilicon acid) resinous product, 20 parts by weight of an isocyanate-terminated polyurethane prepolymer listed below, 5 parts by weight of methylene chloride, 0.3 parts by weight of sodium salt of dodecylbenzene sulphonic acid, 10 parts by weight of an aqueous solution containing 40% sodium silicate and 0.6 parts by weight of "DABCO 33LV" produced by Air Products, are mixed at about 30° C. The mixture begins to expand in 15 to 45 seconds and expands to 8 to 15 times its original volume thereby producing a polyurethane silicon acid foam.

| Example | Isocyanate-terminated polyurethane prepolymer |
|---|---|
| a | tolylene diisocyanate with polypropylene glycol (mol. wt. 500) in an NCO/OH ratio of 25:1 |
| b | diisocyanatodiphenylmethane with a tertafunctional polypropylene glycol (mol. wt. 500) to produce a prepolymer having about 22% NCO groups |
| c | methylene bis-phenyl diisocyanate with a liquid polyepichlorohydrin to produce a prepolymer of an NCO content about 16% and containing 25% by weight of a resin extender, poly alpha-methyl styrene |
| d | toluene diisocyanate with castor oil to produce a prepolymer with an NCO content of about 15%. |
| e | "ISONATE 181" produced by Upjohn |
| f | "FAST CAST ARPRO A" produced by Armco |

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of poly(aldehyde aminosilicon acid) resinous products by mixing and reacting the following components: (a) an aminosilicon acid compound (b) an aldehyde 2. The process of claim 1 wherein 1 to 2 parts by weight of the aminosilicon acid compound are mixed with 1 to 5 parts by weight of an aldehyde compound.

3. The process of claim 1 wherein the aminosilicon acid compound is produced by mixing and reacting 1 to 2 parts by weight of an amino compound with about 1 part by weight of halosilicon acids.

4. The process of claim 3 wherein the amino compound is selected from the group consisting of urea, thiourea, dicyandiamine, aniline, polyamines, guanidine, alkyl-substituted ureas, melamine and mixtures thereof.

5. The process of claim 1 wherein the aldehyde is selected from the group consisting of an aqueous solution of formaldehyde, acetoaldehyde, furfural, crotonaldehyde, acrolein, acrylic aldehyde, butylaldehyde, chloral, paraformaldehyde, benzylaldehyde and mixtures thereof.

6. The process of claim 1 wherein an acid catalyst, selected from the group consisting of mineral acids, organic acids, hydrogen containing alkali metal salts and mixtures thereof, is added to the unreacted mixture until the pH is 4 to 6.

7. The process of claim 1 wherein an alkali catalyst, selected from the group consisting of alkali metal hydroxide, alkali metal carbonate and mixtures thereof in an aqueous solution is added to the unreacted mixture until the pH is 8 to 12.

8. The process of claim 1 wherein an additional step is taken wherein 0.5 to 2 parts by weight of a phenol compound selected from the group consisting of phenol, p-cresol, o-cresol, m-cresol, cresylic acid, xylenols, resorcinol, cashew-nut shell liquids, anacordol, p-tert-butyl phenol, cardol, Bisphenol A, creosote oil, 2,6-dimethylphenol, and mixtures thereof are added with the aminosilicon acid compound and reacted with the aldehyde thereby producing a poly(aldehyde-phenol-aminosilicon acid) resinous product.

9. The product produced by the process of claim 1.

10. The product produced by the process of claim 8.

* * * * *